United States Patent [19]

Rudisill et al.

[11] Patent Number: 5,896,229

[45] Date of Patent: Apr. 20, 1999

[54] DISCRETELY APPLIED DIFFUSOR STRUCTURES ON LIGHTGUIDES

[75] Inventors: Charles Albert Rudisill, Apex; Sean Patrick Ryan, Wake Forest, both of N.C.

[73] Assignee: Ericsson Inc., Research Triangle Park, N.C.

[21] Appl. No.: 08/803,083

[22] Filed: Feb. 20, 1997

[51] Int. Cl.$^6$ ............................................. G02F 1/1335
[52] U.S. Cl. .................. 359/599; 385/119; 385/130; 385/131; 349/61; 349/64
[58] Field of Search ........................ 359/599; 385/119, 385/130, 131; 349/61, 64

[56] References Cited

U.S. PATENT DOCUMENTS

| 4,933,550 | 6/1990 | Hegyi | 250/237 R |
|---|---|---|---|
| 5,148,309 | 9/1992 | Yamada et al. | 359/443 |
| 5,600,456 | 2/1997 | Maruyama et al. | 349/64 |
| 5,619,351 | 4/1997 | Funamoto et al. | 349/61 |

FOREIGN PATENT DOCUMENTS

| 0 571 173 | 5/1993 | European Pat. Off. . | |
|---|---|---|---|
| 0 607 453 | 7/1993 | European Pat. Off. . | |
| 405060908 | 3/1993 | Japan | 359/599 |
| 7-005305 | 1/1995 | Japan . | |
| 7-084103 | 3/1995 | Japan . | |
| 7-191203 | 7/1995 | Japan . | |

OTHER PUBLICATIONS

PCT Search Report, Jun. 18, 1998, PCT/US 98/03061.

*Primary Examiner*—Cassandra Spyrou
*Assistant Examiner*—Mohammad Y. Sikder
*Attorney, Agent, or Firm*—Jenkens & Gilchrist

[57] ABSTRACT

A applied diffusor structure for lightguides fabricated out of a flexible transparent film substrate. The substrate having high resolution complex patterns printed on the surface of the substrate using any high resolution printing process. The substrate affixed to the lightguide using a transparent adhesive or alternatively the substrate is molded to the lightguide.

1 Claim, 3 Drawing Sheets

1

DISCRETELY APPLIED DIFFUSOR STRUCTURES ON LIGHTGUIDES

BACKGROUND OF THE INVENTION

1. Technical Field of the Invention

The present invention pertains in general to lightguides for backlighting of keypads and liquid crystal displays, and more particularly, to diffusor structures which are incorporated into lightguides.

2. Description of Related Art

Keypads and liquid crystal displays commonly utilize a lightguide to transmit light across the liquid crystal display or keypad from a light source. In order to diffuse the light evenly, defusing structures are incorporated into the lightguide. The most common method for incorporating diffusing structures into the lightguide is to print diffusor dots or diffusor patterns onto a rear surface of the light guide. Typically, a screen printing process or pad printing process is used to print the diffusor dots or patterns directly onto the rear surface of the lightguide. The pad printing and screen printing processes have limitations as to the resolution of the diffusor patterns which can be printed and also limit the surface topography of the lightguide on which the patterns can be printed. For example, feature sizes must be at least 0.004 to 0.006 inches in size using the screen printing process and even larger for the pad printing process. Furthermore, these processes may not be used on surface topographies having confined areas, such as recesses, or on areas with adjacent features such as pins. Moreover, these processes can not be used on lightguides having significantly contoured non-planar surfaces.

The resolution limitations imposed by the pad printing and screen printing processes create another problem for backlighting of liquid crystal displays and keypads. In order to achieve uniform and efficient illumination across the entire length of the lightguide, diffusor patterns need to be small in size and low in density near the light source where light is abundant and increasingly larger in size and more dense the further the distance from the light source. In certain circumstances, the screen printing and pad printing processes cannot achieve the resolutions required for uniform backlighting. The result is the creation of localized bright spots. To address this problem, additional diffusers constructed out of textured or frosted Mylar are located between the lightguide and the display.

It would be advantageous, therefore, to create a lightguide incorporating a diffusor structure which overcomes the resolution and typography limitations associated with the pad printing and screen printing processes.

SUMMARY OF THE INVENTION

The present invention comprises a diffusor structure for use with a lightguide created by printing a diffusor pattern on a front or rear surface of a flexible planar film substrate. The diffusor pattern is printed on the substrate using any one of numerous printing processes, such as photolithography printing, to produce high resolution and complex patterns on the substrate. The substrate, including the diffusor pattern, is then affixed to the lightguide either using a transparent adhesive or by placing the substrate in an injection mold during the fabrication of the lightguide.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1A:
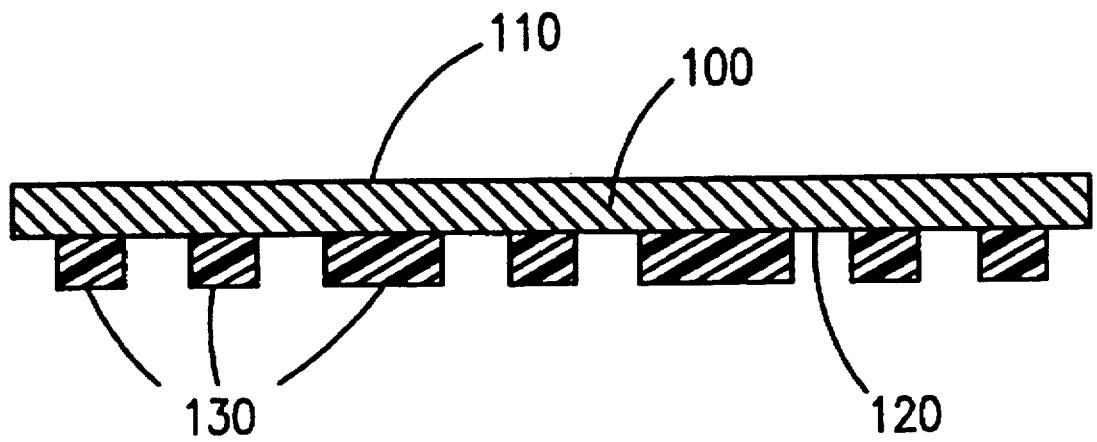
FIG. 1A is a cross-sectional view of a planar film substrate having a diffusor pattern printed on a rear surface of the substrate.

Referring now to FIG. 1A, there is illustrated a flexible planar film substrate 100 having a front surface 110 and a rear surface 120. Printed on the rear surface 120 of the substrate 100 is a diffusor pattern 130. The thickness of the pattern 130 has been exaggerated in the illustration.

Figure 1B:
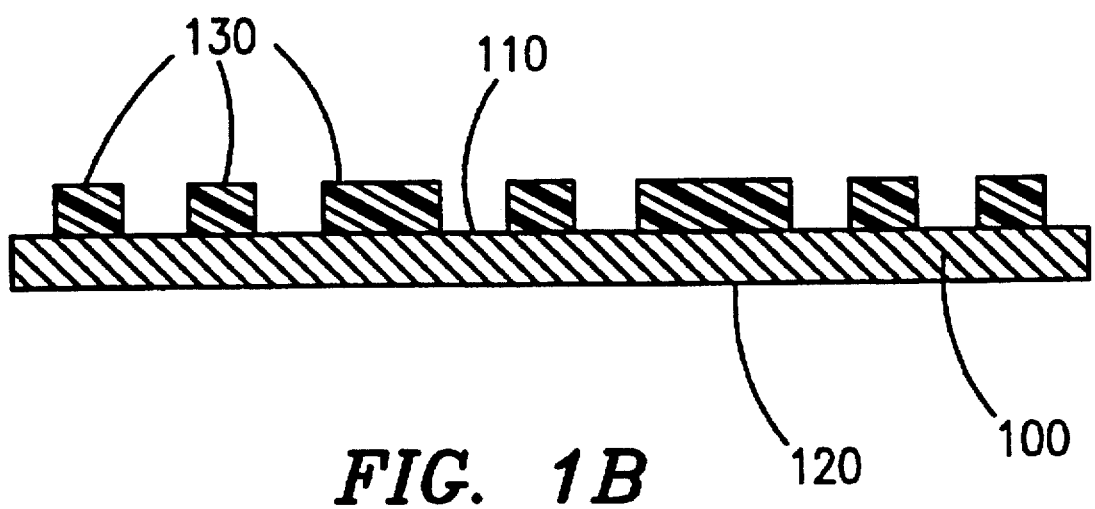
FIG. 1B is a cross-sectional view of a planar film substrate having a diffusor pattern printed on a front surface of the substrate.

Referring additionally now to FIG. 1B, there is illustrated a flexible planar film substrate 100 having a front surface 110 and a rear surface 120. Printed on the front surface 110 of the substrate 100 is a diffusor pattern 130. The thickness of the pattern 130 has been exaggerated in the illustration.

The flexibility of the substrate 100 allows the diffusor patterns 130 to be printed on the surfaces 110 or 120 of the substrate 100 using any of a number of available printing processes, such as photolithography printing, which require the substrate to traverse through printing machines having various rollers and other mechanisms which flex the substrate 100. The printing material used for the diffusor patterns 130 is made of a polymer matrix material containing particles possessing a high index of refraction. The high index of refraction makes the particles translucent or opaque. These particles have multiple surfaces or facets which are randomly aligned in the polymer matrix material. As light reaches these particles from the light source, the particles diffuse the light at various angles due to their numerous surfaces and random orientation with respect to the light source. The diffusor patterns 130 printed on the substrate 100 can be monochromatic using particles of only one color such as white paint or can be polychromatic using a multi-colored pattern with corresponding particles of multi-colors such as multi-colored paint.

Figure 2A:
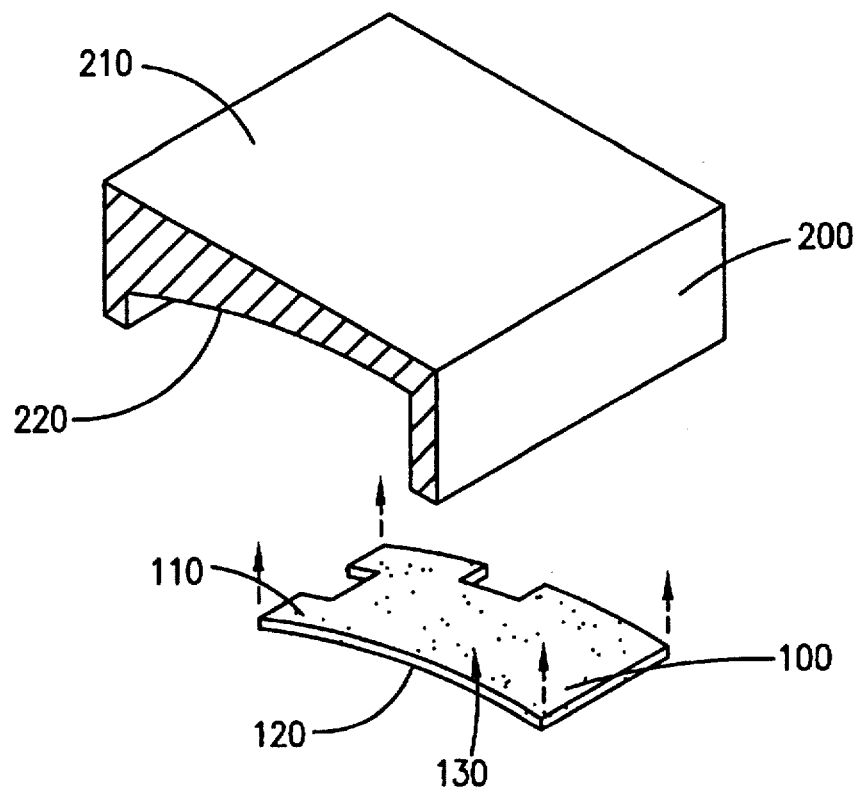
FIG. 2A is a perspective view of a lightguide having a non-planar rear surface and a film substrate flexed to match the contour of the rear surface of the lightguide.

Referring additionally now to FIG. 2A, there is illustrated a lightguide 200 having a front surface 210 and a rear surface 220. A planar film substrate 100 is constructed from a flexible material having an index of refraction similar to that of the material for the lightguide 200, such as polycarbonate, polyester, or acrylic. The index of refraction of the lightguide 200 and the index of refraction of the substrate 100 need to be sufficiently similar so as to allow light to pass from the lightguide 200 into the substrate 100 without being reflected back into the lightguide 200 as happens with materials having dissimilar indices of refraction. It is also important that the rear surface 220 of the lightguide 200 and the front surface 110 of the substrate 100 be polished sufficiently smooth to allow light to pass from the lightguide 200 into the substrate 100 without diffusion back into the lightguide 200. Materials which are transparent possess indices of refraction which are sufficiently similar to the indices of refraction of materials used in lightguides 200 to be suitable for use as the film substrate 100. Dots are illustrated on the substrate 100 to represent the diffusor pattern 130.

The flexible film substrate 100 has a front surface 110 and a rear surface 120. The substrate 100 is cut and flexed to match the shape and the contour of the rear surface 220 of the lightguide 200. In one embodiment of the present invention, a transparent adhesive is placed on the front surface 110 of the substrate 100, or alternatively, the transparent adhesive is placed on the rear surface 220 of the lightguide 200. The substrate 100 is then pressed against the rear surface 220 of the lightguide 200 and the adhesive affixes the substrate 100 to the lightguide 200.

Figure 2B:
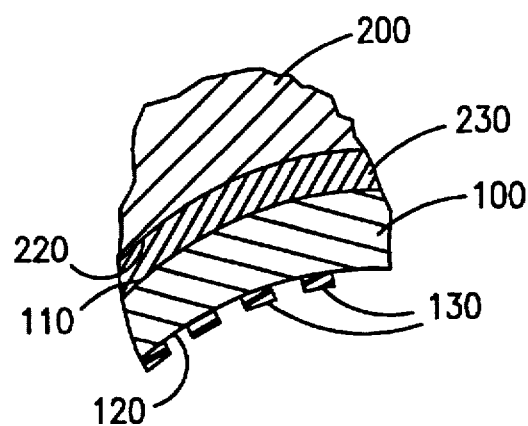
FIG. 2B is a partial cross-sectional view of the lightguide and film substrate of FIG. 2A affixed to each other using an adhesive with the substrate having a diffusor pattern printed on a rear surface of the substrate.

Referring additionally now to FIG. 2B, there is illustrated a partial cross-sectional view of the substrate 100 affixed to the lightguide 200 using a layer of transparent adhesive 230. In this figure the diffusor patterns 130 are printed on the rear surface 120 of the substrate 100. The thickness of the pattern 130 has been exaggerated in the illustration.

Figure 2C:
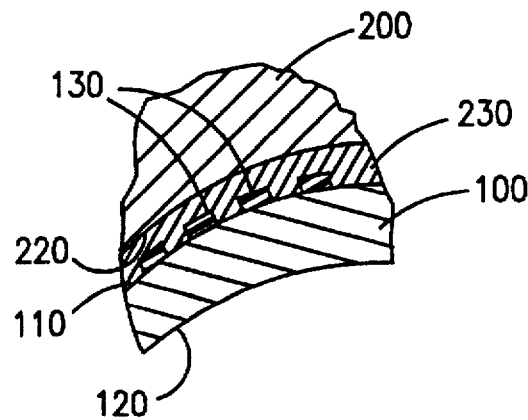
FIG. 2C is a partial cross-sectional view of the lightguide and film substrate of FIG. 2A affixed to each other using an adhesive with the substrate having a diffusor pattern printed on a front surface of the substrate.

Referring additionally now to FIG. 2C, there is illustrated a partial cross-sectional view of the substrate 100 affixed to the lightguide 200 using a layer of transparent adhesive 230. In this figure the diffusor patterns 130 are printed on the front surface 110 of the substrate 100. The thickness of the pattern 130 has been exaggerated in the illustration.

Figure 3A:
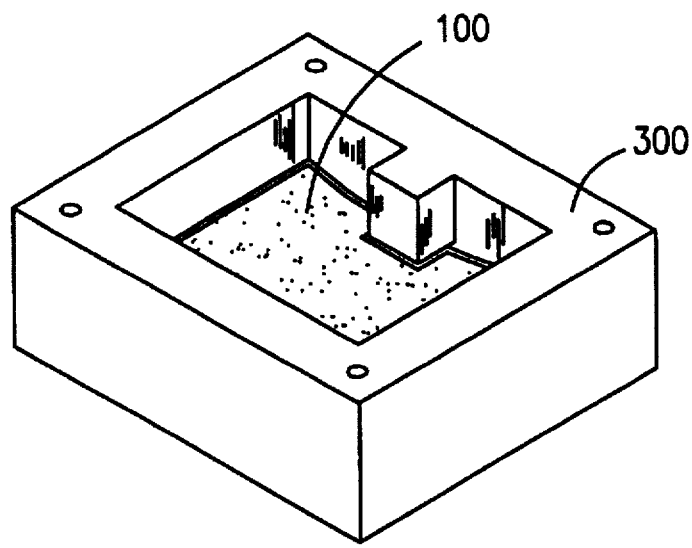
FIG. 3A is a perspective view of an injection mold with a film substrate placed across the bottom of the mold.

Referring additionally now to FIG. 3A, there is illustrated an injection mold 300 used to fabricate the lightguide 200. Prior to the injection molding process, the substrate 100 is cut and placed into the bottom of the injection mold 300. Dots are illustrated on the substrate 100 to represent the diffusor pattern 130. A lightguide 200 is then fabricated by an injection molding process with the substrate 100 being molded to the rear surface 200 of the lightguide 200.

Figure 3B:
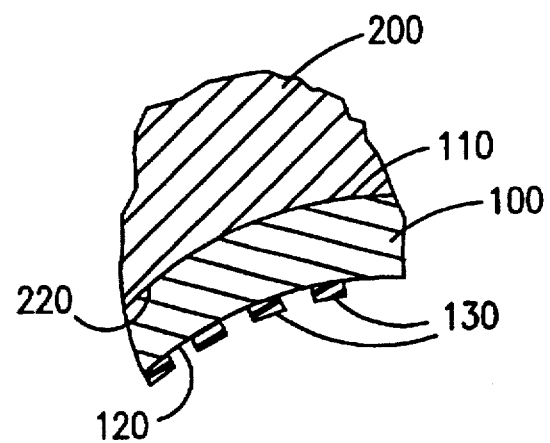
FIG. 3B is a partial cross-sectional view of a lightguide having a film substrate molded to a rear surface of the lightguide and the substrate having a diffusor pattern printed on a rear surface of the substrate.

Referring additionally now to FIG. 3B, there is illustrated a partial cross-sectional view of the lightguide 200 having a rear surface 220 molded to the front surface 110 of the substrate 100. The diffusor patterns 130 are printed on the rear surface 120 of the substrate 100. The thickness of the pattern 130 has been exaggerated in the illustration.

Figure 3C:
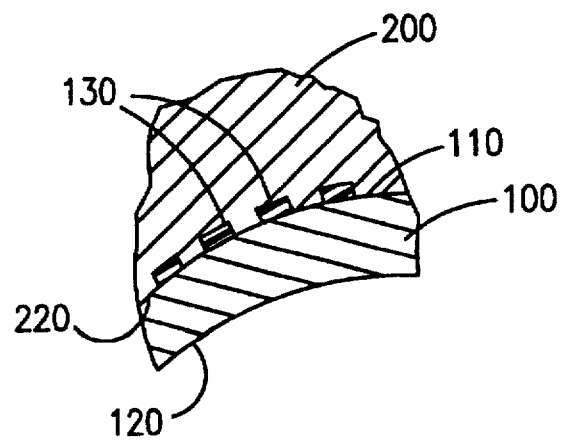
FIG. 3C is a partial cross-sectional view of a lightguide having a film substrate molded to a front surface of the lightguide and the substrate having a diffusor pattern printed on a front surface of the substrate.

Referring additionally now to FIG. 3C, there is illustrated a partial cross-sectional view of the lightguide 200 having a rear surface 220 molded to the front surface 110 of the substrate 100. The diffusor patterns 130 are printed on the front surface 110 of the substrate 100. The thickness of the pattern 130 has been exaggerated in the illustration.

Although various preferred embodiments of the apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A diffusor structure for a lightguide comprising:

a planar film substrate; and a diffusor pattern printed on a front surface of the planar film substrate;

wherein the diffusor pattern is printed on the planar film substrate with a printing material containing translucent particles.

* * * * *